United States Patent

[11] 3,601,525

[72] Inventor John J. Oravec
 Union, N.J.
[21] Appl. No. 1,822
[22] Filed Jan. 9, 1970
[45] Patented Aug. 24, 1971
[73] Assignee Federal Pacific Electric Company
 Newark, N.J.

[54] SUPPORTED HIGH VOLTAGE BUS BARS
 4 Claims, 2 Drawing Figs.

[52] U.S. Cl. .................................................... 174/171,
 174/156
[51] Int. Cl. ............................................. H01b 17/18
[50] Field of Search .......................................... 174/68 B,
 99 B, 129 B, 133 B, 149 B, 155, 156, 157, 168,
 169, 171

[56] References Cited
 UNITED STATES PATENTS
 1,228,142  5/1917  Sessions ..................... 174/129 B UX
 2,053,561  9/1936  Jennison ..................... 174/133 B X
 2,246,904  6/1941  Stockinger .................. 174/171
 2,865,980  12/1958  Popovich et al. ............ 174/99 B X
 3,011,011  11/1961  Christensen ................. 174/99 B
 3,519,733  7/1970  Eichelberger et al. ......... 174/171

OTHER REFERENCES

Bulletin 31-C entitled " Indoor Bus Supports and Fittings," published Delta-Star Electric Co., Chicago, Illinois, page 8. Received in Patent Office Library on Jan. 10, 1941, copy in Group 215.

Primary Examiner—Laramie E. Askin
Attorney—Paul S. Martin

ABSTRACT: Bus bar clamps for insulation covered bus bars in a high voltage alternating current system are carried by standoff insulators, these bus bar clamps being made of insulating material to avoid the effect, in the case of prior art metal clamps, of the clamps becoming energized by capacitance to the bus bar. This capacitance resulted in sustained electrical stress on the insulation covering of the bus bars, leading possibly to breakdown of the insulation covering and resulting in shock hazard to personnel coming into contact with the supposedly insulated prior art metal clamps. All of this is avoided by the clamps made of insulation in the novel assembly.

PATENTED AUG24 1971  3,601,525
FIG.1
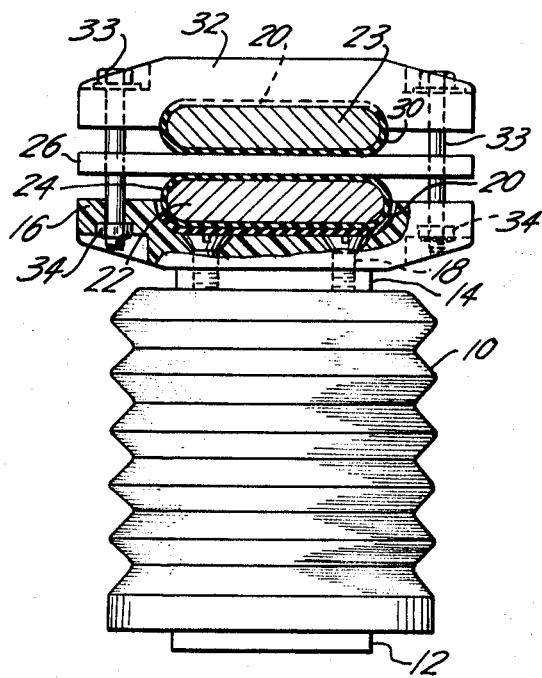
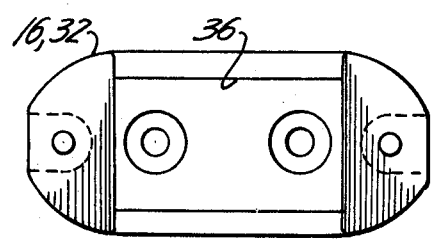
FIG.2

SUPPORTED HIGH VOLTAGE BUS BARS

The present invention is concerned with bus bars for carrying alternating current at high voltage, and with bus bar supports.

It is standard practice to use insulation-covered bus bars in equipment designed for carrying alternating current at 5 to 15 kv. Technically this is a "medium voltage" classification, but it is called "high voltage" here to contrast with the type of construction used for 600 v. and less. The equipment ordinarily includes various grounded metal parts such as a sheet metal enclosure, metal structural members and so forth near the bus bars. Standoff insulators (such as porcelain) support the bus bars and provide the necessary spacing from such grounded structure.

In the past, metal members have been used to secure the insulation-covered bus bars to standoff insulators. Such metal members are insulated from ground since they are supported on a standoff insulator, and such metal members are also insulated from the bus bar or bus bars by the insulation that covers the bus bars. However, each clamping member of metal constitutes a conductor that has substantial area confronting the bus bar and separated from the bus bar by the thickness of the bus bar insulation, and thus each metal clamping plate and the bus bar inherently, constitute a capacitor. This capacitive effect may be insignificant where low voltage is used as in lighting circuits (for example) but at 5 kv. 15 kv. the effect can be important. The metal clamping plate is bare, freely exposed to the surrounding space. Some current can flow from the bar to ground in a series path including the capacitance represented by the metal clamping plates and the bus bar and the combined capacitive and leakage path from the metal clamping paths to ground. This imposes an enduring dielectric stress on the bus bar insulation within the metal clamp, possibly leading to failure. The stress rises to line voltage if a grounded conductor should touch the metal bus bar clamp. In that event the bus bar insulation is subjected to a high level of localized electric field stresses, possibly leading to insulation breakdown. In case a person should touch the metal clamping plate, the capacitive effect causes a distinct shock hazard even where the insulation on the bus bar is excellent. But if there is a flaw in the insulation, the shock hazard is most serious.

In accordance with the present invention insulation-covered bus bars are secured to standoff insulators by clamping members made of insulating material. The illustrative embodiment of the invention includes pairs of clamping members for gripping plural bus bars. At least one of the clamping members of each pair has a recess that receives and locates the bus bar. The recessed clamping member extends across a face of the bus bar, and portions of the clamping member are opposite at least part of each of the edges of each clamped bus bar. Ordinarily the clamps of insulation are of a hard material. A resilient layer of insulation is used as a cushion between the insulation covered bus bar and the supporting recessed clamp member.

The nature of the invention and its various objects, novel features and advantages will be better appreciated from the following detailed description of an embodiment of the invention that is shown in annexed drawings. In the drawings:

FIG. 1 is a lateral view of a bus-bar-supporting structure, including a pair of bus bars shown in transverse cross section; and FIG. 2 is a top plan view of the lowest clamping member in the structure of FIG. 1.

In the drawing, a standoff insulator 10 commonly made of porcelain has metal fittings 12 and 14 united as by cement to its opposite ends. A formed clamping member 16 of insulation is secured to member 14 by a pair of recessed flathead screws 18. A rubber pad 20 covers the heads of screws 18 and provides a cushion for an insulated bus bar 22 that is carried by member 16. Bus bar 22 has a covering of insulation 24 such as a hard epoxy covering that is applied, for example, by the fluidized bed process. A plate 26 of insulation constitutes a clamping member on top of bus bar 22 and its insulation covering 24. Another bus bar 23 with its insulation covering 30 rests on plate 26 and another formed clamp 32 of insulation overlies bus bar 23. Members 16 and 32 are of identical shape, and are interchangeable. Bolts 33 extend through all three clamping members 16, 26 and 32, spaced from the edges of bus bars 24 and 23. These bolts are tightened into nuts 34 so that the clamping members grip the bus bars tightly. There is a shallow recess 36 (FIG. 2) in members 16 and 32 having margins that contain and locate the rubber pads 20, the rubber pads being thicker than the depth of the recess even when the clamps are tight. These rubber pads avoid imposing localized mechanical stresses on the insulation covering 24 and 30 of the bus bars. In the case of the lower clamping member 16, the rubber pad also provides added spacing between the metal which forms bus bar 24 and the heads of screws 18, further limiting the very small capacitance that is developed at each screw head opposite the lower bus bar 24.

In structures having only one bus bar, clamping member 32 is omitted and bolts 33 tighten clamping members 16 and 26 against that bus bar 22.

If members 16 and 32 were of metal, than each one of them would act as a capacitor plate opposite the related bus bar 22 and 23. If those bus bars were energized with alternating current at high voltage, then such metal clamping members would assume an AC potential. This is because the plates have a large area opposite the bus bars and thus act as part of one capacitor in series with the capacitance-to-ground of the (metal) clamping plates. That condition could lead to localized breakdown of the insulation covering on the bus bars, and it also represents a shock hazard to personnel when working nearby. Being of insulation, clamping members 16, 26 and 32 do not have any significant AC potential induced in them and therefore do not create a shock hazard. The clamps do not impose localized field stresses on the insulation covering of the bus bars. Bolts 33 involve only a small amount of area and they are spaced by a considerable distance from the edge areas of the bus bars. Consequently, those bolts develop only minimal capacitive induction. Similarly, the heads of screws 18 are so small that only a minimal amount of capacitive induction can develop there.

Members 16 and 32 are of identical shape, one being inverted in relation to the other. They may be of glass-filled polyesters and of phenolic molding material, and they can be of polycarbonate and of nylon, and they can also be of either rigid or semiflexible epoxy compositions, each material being compression molded, injection molded or cast as may be appropriate. Each of the bus bars 22 and 23 has one face and portions of its edges adjoining that face constrained and located by at least one formed clamping member 16 and 32.

Variations of the novel features in the foregoing embodiment will, of course, occur to those skilled in the art and therefore the invention should be construed broadly in accordance with its full spirit and scope.

What is claimed is:

1. Apparatus for carrying alternating current at high voltage, including an insulation-covered bus bar, means positioning said bus bar including a pair of bus bar clamping members of insulating material gripping said bus bar therebetween, at least one of said clamping members having a recess receiving and conforming approximately to one face and at least part of the adjoining edges of said bus bar, means tightening the grip of said clamping member on said bus bar, and a standoff insulator carrying said clamping members.

2. Apparatus in accordance with claim 1 wherein said tightening means includes a pair of bolts extending through said clamping members across opposite edges of said bus bar, and fastening means securing one of said clamping members to said standoff insulator.

3. Apparatus in accordance with claim 1 including a second insulation-covered bus bar, a third clamping member cooperating with one of said pair of clamping members and positioning said second insulation-covered bus bar, said clamping members having means forming two recesses as aforesaid including one recess for each of said bus bars.

4. Apparatus in accordance with claim 1, including screws extending through one of said clamping members and into said standoff insulator, said screws having heads recessed into said one of said clamping members, and a resilient pad of insulation covering said heads of said screws and interposed between said one of said clamping members and the bus bar thereon.